US009881317B2

(12) United States Patent
Oki et al.

(10) Patent No.: US 9,881,317 B2
(45) Date of Patent: Jan. 30, 2018

(54) INFORMATION PROCESSING APPARATUS, INFORMATION PROCESSING METHOD, INFORMATION COMMUNICATION SYSTEM, AND COMPUTER PROGRAM

(71) Applicant: FeliCa Networks, Inc., Tokyo (JP)

(72) Inventors: Junichi Oki, Tokyo (JP); Hiroyuki Nagasawa, Tokyo (JP); Kenichi Motodate, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 642 days.

(21) Appl. No.: 13/909,420

(22) Filed: Jun. 4, 2013

(65) Prior Publication Data
US 2013/0339133 A1  Dec. 19, 2013

(30) Foreign Application Priority Data

Jun. 11, 2012 (JP) ................................ 2012-131908

(51) Int. Cl.
G06Q 30/00 (2012.01)
G06Q 30/02 (2012.01)
G06Q 30/06 (2012.01)

(52) U.S. Cl.
CPC ......... *G06Q 30/0246* (2013.01); *G06Q 30/02* (2013.01); *G06Q 30/06* (2013.01)

(58) Field of Classification Search
CPC ................................................ G06C 30/0246
USPC ...................................................... 705/14.45
See application file for complete search history.

(56) References Cited

U.S. PATENT DOCUMENTS 5,592,611 A * 1/1997 Midgely ............. G06F 11/1443
370/218
5,825,884 A * 10/1998 Zdepski ............. G06Q 20/0855
348/E7.056
6,185,619 B1 * 2/2001 Joffe ....................... G06F 9/505
709/223

(Continued)

FOREIGN PATENT DOCUMENTS

JP    2006-113884 A    4/2006
JP    2007-193613 A    8/2007

(Continued)

OTHER PUBLICATIONS

WO 2009/013700, pp. 1-20, Jan. 29, 2009.*

(Continued)

*Primary Examiner* — David Stoltenberg
*Assistant Examiner* — Michael Ezewoko
(74) *Attorney, Agent, or Firm* — Chip Law Group (57) ABSTRACT

An information processing apparatus includes a customer guiding information management unit configured to obtain a content ID used to identify an application introduction source site and an individual identification ID used to identify a user terminal which has accessed the introduction source site and manage the content ID and the individual identification ID as customer guiding information, and a result measurement unit configured to obtain information including an individual identification ID of a user terminal which has downloaded an application, compare the information with the customer guiding information managed by the customer guiding information management unit, and measure a result of the introduction source site identified by the content ID included in the customer guiding information.

13 Claims, 3 Drawing Sheets

(56) References Cited

U.S. PATENT DOCUMENTS

| | | | |
|---|---|---|---|
| 6,219,692 B1* | 4/2001 | Stiles | H04L 67/1002 709/201 |
| 6,223,209 B1* | 4/2001 | Watson | H04L 29/06 709/201 |
| 6,298,373 B1* | 10/2001 | Burns | G06F 17/30902 707/E17.12 |
| 6,370,580 B2* | 4/2002 | Kriegsman | G06F 17/30067 709/226 |
| 2012/0265595 A1* | 10/2012 | Corner | G06Q 30/02 705/14.23 |

FOREIGN PATENT DOCUMENTS

| | | |
|---|---|---|
| JP | 2009-276932 A | 11/2009 |
| JP | 2010-250752 A | 11/2010 |

OTHER PUBLICATIONS

Cognition—From Memory to Creativity, Weisberg, Reeves, 2013, John Wiley & Sons, pp. 13-40, 519-527.*

Microsoft Computer Dictionary, Fifth Edition, 2002, Microsoft Press, p. 23.*

Mind—A Brief Introduction, John R. Searle, 2004, Oxford University Press, pp. 62-67.*

What is Thought, Eric Baum, The MIT Press, 2004, pp. 33-65.*

Robotics, Science and Systems III, Wolfram Burgard, Oliver Brock, and Cyrill Stachniss, The MIT Press, 2008, pp. 41-48.*

Language and Mind, Chomsky, Oxford University Press, 2005, p. 62.*

Computing the Mind, Shimon Edelman, Oxford University Press, 2008, pp. 26-31.*

Noetics, Lawrence Krader, 2010, Peter Lang Publishing, pp. 551-553.*

Britannica Concise Encyclopedia, Encyclopedia Britannica, 2006, p. 537.*

Explaining Creativity, Keith Sawyer, 2006, Oxford University Press, pp. 104-105.*

The Way We Think, Fauconnier, 2010, Persues Books Group, Chapter 1, Chapter 13.*

Creativity and Artificial Intelligence, Francisco Camara Pereira, Mouton de Gruyter, 2007, pp. 51-62.*

Mental Spaces, Gilles Fauconnier, Cambridge University Press, 1998, pp. xxviii-xxix.*

* cited by examiner

FIG. 2

INFORMATION PROCESSING APPARATUS, INFORMATION PROCESSING METHOD, INFORMATION COMMUNICATION SYSTEM, AND COMPUTER PROGRAM

CROSS-REFERENCE TO RELATED APPLICATION

The present application claims priority from Japanese Patent Application No. JP 2012-131908 filed in the Japanese Patent Office on Jun. 11, 2012, the entire content of which is incorporated herein by reference.

BACKGROUND

The present technique disclosed in this specification relates to information processing apparatuses which measure information on download of an application from an application download site using a user terminal on a network, information processing methods, information communication systems, and computer programs. In particular, the present technique relates to an information processing apparatus which performs tracking to an introduction source site which introduces an application to a user terminal, an information processing method, an information communication system, and a computer program.

In recent years, a result-reward advertisement system referred to as "affiliate" has become popular. Specifically, a link to a company site is added to a website or a mail magazine, and when a viewer who is viewing the website uses a service in the website of a link destination, that is, when the viewer purchases a product or performs member registration or the like through the link, an operator of the website of a link source gains a reward.

In addition, application download services using multifunctional terminals, such as smart phones employing Android OSs, have become popular.

To realize this system, results of advertisements should be measured. In general, assuming that a result is measured on a web browser, tracking to a link source is performed using a cookie or a URL (Uniform Resource Locator).

For example, a web browser operating in a user terminal stores information used to identify an introduction source site in a cookie of the web browser, and communicates with a server using the information stored in the cookie so as to transmit and receive information used for measurement. Furthermore, an advertisement delivery apparatus which embeds tracking information (a URL of an affiliate ID) in a link of a URL directing a viewer to a website of a seller and which performs a calculation of a result reward for affiliate using the information has been proposed (refer to Japanese Unexamined Patent Application Publication No. 2006-113884, for example). In addition, an affiliate tracking system which records a unique key associated with an advertising medium site and an advertiser as a cookie in a terminal has been proposed (refer to Japanese Unexamined Patent Application Publication No. 2010-250752, for example). Furthermore, an affiliate service provision server which records a cookie including affiliate information and advertiser information in a user terminal, redirects the cookie to a server of the advertiser, and collects the cookie from the user terminal when performance corresponding to a result of an advertisement of a product or an advertising element is completed in the website of the advertiser using the user terminal has been proposed (refer to Japanese Unexamined Patent Application Publication No. 2007-193613, for example).

However, when such a measurement method using a cookie or a URL is used, tracking of a result of an application download site may not be performed.

For example, in a case where an application introduced on a website being viewed through a web browser is to be downloaded from an application download page, a connection to an introduction source site is disconnected at a time when the download of the application from the application download page is started. Therefore, after the disconnection, result tracking is not performed. This is because, although an application download page is viewed after an application for an application download is activated in general, this application does not cooperate with the web browser. This case corresponds to a situation in which an Android terminal activates a market application and downloads an application from an Android market.

Furthermore, when a result is generated in response to a certain operation performed after an application is downloaded, the result is not measured in a link source. For example, when a result is generated after an application is activated for the first time, member registration is performed, and the member registration is completed, a link source corresponding to the result is not determined.

That is, since reliable information associated with the terminal is not obtained, a provider of the application does not recognize that the application has been downloaded through the introduction source site.

In addition, security problems also arise in an affiliate system utilizing cookies and URLs, such as risks of fake tracking IDs and inability to ensure uniqueness.

Meanwhile, an affiliate tracking system which performs affiliate tracking on a mobile terminal incorporating a contactless IC card has also been proposed (refer to Japanese Unexamined Patent Application Publication No. 2009-276932, for example). However, in this system, although tracking for obtaining information representing whether a user of a mobile terminal has visited a specific location, such as a shop, may be performed, tracking for obtaining information representing whether an application has been downloaded in the mobile terminal is not performed.

SUMMARY

It is desirable to provide an excellent information processing apparatus which measures information on download of an application from an application download site using a user terminal on a network, an excellent information processing method, an excellent information communication system, and an excellent computer program.

It is further desirable to provide an excellent information processing apparatus which measures a result of an introduction source site which introduces an application by performing tracking to the introduction source site, an excellent information processing method, an excellent information communication system, and an excellent computer program.

An information processing apparatus according to an embodiment of the present disclosure includes a customer guiding information management unit configured to obtain a content ID used to identify an application introduction source site and an individual identification ID used to identify a user terminal which has accessed the introduction source site and manage the content ID and the individual identification ID as customer guiding information, and a result measurement unit configured to obtain information including an individual identification ID of a user terminal which has downloaded an application, compare the information with the customer guiding information managed by the customer guiding information management unit, and measure a result of the introduction source site identified by the content ID included in the customer guiding information.

The customer guiding information management unit may obtain an individual identification ID stored in a contactless IC chip included in a user terminal which has accessed the introduction source site.

The customer guiding information management unit may obtain an individual identification ID stored in a contactless IC chip included in the user terminal in response to an operation of selecting an application to be downloaded from the introduction source site performed by the user terminal.

The customer guiding information management unit may store the customer guiding information in the information processing apparatus.

The customer guiding information management unit may write the customer guiding information to a contactless IC chip included in the user terminal.

The result measurement unit may measure a result of the introduction source site when the application downloaded in the user terminal enters a predetermined state in the user terminal.

The result measurement unit may measure a result of the introduction source site when the application downloaded in the user terminal is activated for the first time and a predetermined procedure of registration to a predetermined server is completed.

The application downloaded in the user terminal may read information used for result measurement from a contactless IC chip included in the user terminal when being activated for the first time and transmit the read information to a predetermined server. The result measurement unit may measure a result of a corresponding introduction source site in accordance with the information used for the result measurement which is received through the predetermined server.

The application activated in the user terminal may read the individual identification ID from a contactless IC chip included in the user terminal and transmits the individual identification ID to a predetermined server. The result measurement unit may compare the individual identification ID supplied through the predetermined server with the customer guiding information stored in the customer guiding information management unit and measures a result of a corresponding introduction source site.

The customer guiding information management unit may write the customer guiding information to a contactless IC chip included in a corresponding user terminal. The application activated in the user terminal may read the customer guiding information from the contactless IC chip included in the user terminal and transmit the customer guiding information to a predetermined server. The result measurement unit may measure a result of a corresponding introduction source site in accordance with the customer guiding information supplied through the predetermined server.

An information processing method according to another embodiment of the present disclosure includes obtaining a content ID used to identify an application introduction source site and an individual identification ID used to identify a user terminal which has accessed the introduction source site and managing the content ID and the individual identification ID as customer guiding information, and obtaining information including an individual identification ID of a user terminal which has downloaded an application, comparing the information with the managed customer guiding information, and measuring a result of the introduction source site identified by the content ID included in the customer guiding information.

An information communication system according to a further embodiment of the present disclosure includes an application introduction source site, a user terminal configured to include a contactless IC chip which stores at least an individual identification ID and download an application introduced by the application introduction source site from an application download site, a content provider server configured to perform a predetermined procedure associated with the application downloaded by the user terminal, and an affiliate measurement system configured to obtain a content ID used to identify the application introduction source site and an individual identification ID used to identify the user terminal which has accessed the introduction source site, manage the content ID and the individual identification ID as customer guiding information, compare information read by the content provider server from a contactless IC chip included in the user terminal which performs the predetermined procedure with the customer guiding information, and measure a result of the introduction source site identified by the content ID included in the customer guiding information.

Note that the term "system" described herein represents logical aggregation of a plurality of apparatuses (or functional modules which realize specific functions), and the apparatuses or the functional modules may be or may not be incorporated in a single housing.

A computer readable program according to a still further embodiment of the present disclosure causes a computer to function as a customer guiding information management unit configured to obtain a content ID used to identify an application introduction source site and an individual identification ID used to identify a user terminal which has accessed the introduction source site and manage the content ID and the individual identification ID as customer guiding information, and a result measurement unit configured to obtain information including an individual identification ID of a user terminal which has downloaded an application, compare the information with the customer guiding information managed by the customer guiding information management unit, and measure a result of the introduction source site identified by the content ID included in the customer guiding information.

The computer program defines a computer readable program which realizes a predetermined process in the computer. In other words, when the computer program is installed, a cooperation mechanism is realized in the computer and effect the same as that of the information processing apparatus may be obtained.

According to the technique disclosed in this specification, an information processing apparatus which measures information on download of an application from an application download site using a user terminal on a network, an information processing method, an information communication system, and a computer program may be provided.

Furthermore, according to the technique disclosed in this specification, an excellent information processing apparatus which measures a result of an instruction source site which introduces an application by tracking the introduction source site, an excellent information processing method, an excellent information communication system, and an excellent computer program may be provided.

Further objects, features, and advantages of the technique disclosed in this specification will become apparent from the following description of an exemplary embodiment with reference to the accompanying drawings.

DETAILED DESCRIPTION OF EMBODIMENTS

Hereinafter, an embodiment of the present technique disclosed in this specification will be described in detail with reference to the accompanying drawings.

Figure 1:
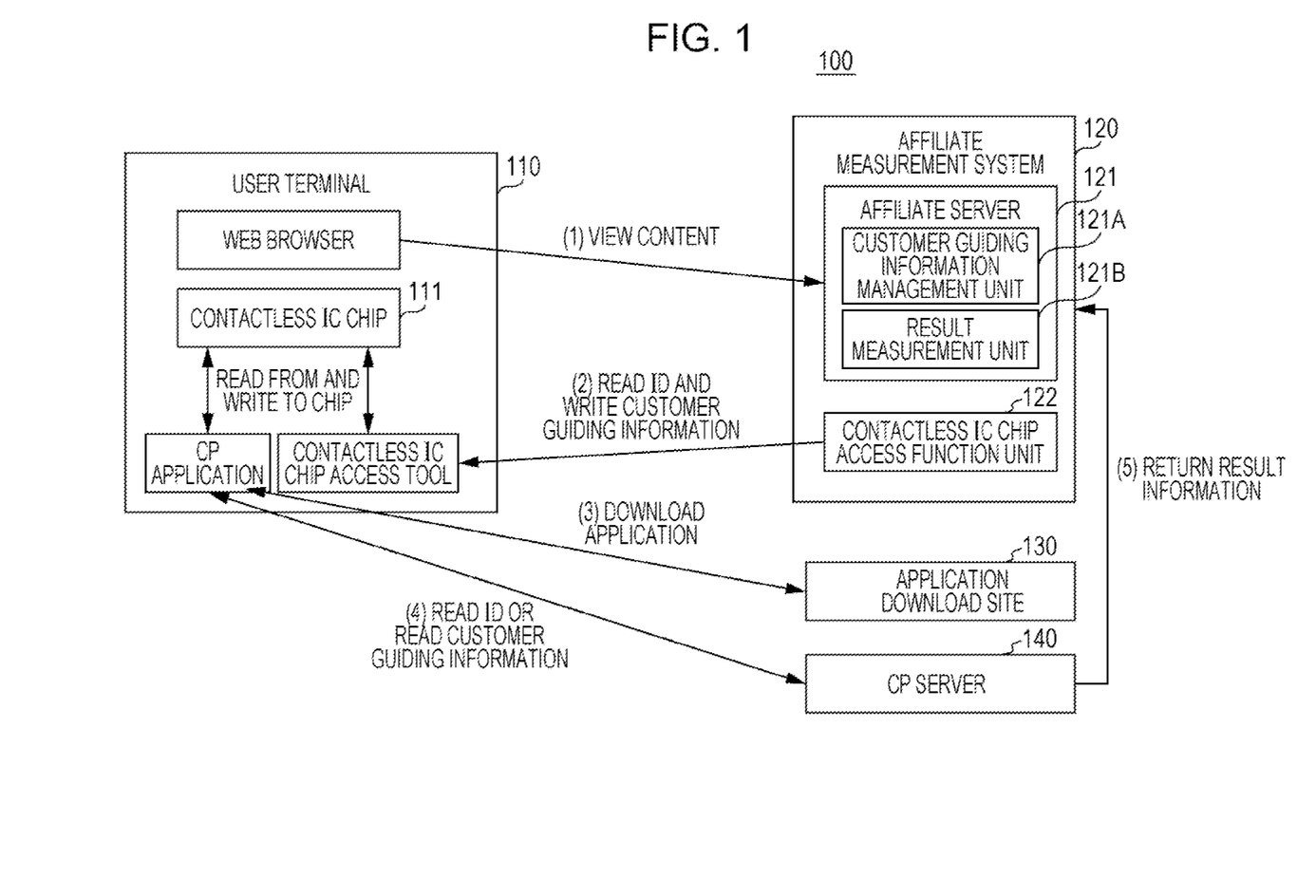
FIG. 1 is a diagram schematically illustrating a configuration of an information communication system which employs a technique disclosed in this specification and performs affiliate measurement.

FIG. 1 is a diagram schematically illustrating a configuration of an information communication system 100 employing the technique disclosed in this specification. The image communication system 100 in FIG. 1 includes a user terminal 110, an affiliate measurement system 120, an application download site 130, and a content provider (CP) server 140. The apparatuses 110 to 140 are connected to one another through a wide area network (not shown), such as the Internet or a mobile telephone network. However, a network communication is one generally used and does not directly relate to the scope of the present technique disclosed in this specification, and therefore, a detailed description thereof is omitted.

The user terminal 110 may use various content. The term "content" includes web pages and applications. The user terminal 110 may activate a web browser so as to display content of web pages of a server site (for example, a content supply server, which will be described hereinafter) through a web browser screen. Furthermore, the user terminal 110 includes applications including the web browser as default and may download applications with charge or without charge from server sites such as the application download site 130. In any case, in the user terminal 110, installed applications may be activated and utilized on an OS (an Operating System). Here, an example of the OS is an Android OS, and the user terminal 110 may be a multifunctional terminal, such as a "smart phone" including the Android OS. Furthermore, in this embodiment, it is assumed that the user terminal 110 incorporates a contactless IC chip 111. The contactless IC chip 111 stores therein an individual identification ID used to identify an individual, such as a product serial number.

The web pages viewed on the user terminal 110 include web pages including a description representing introduction of content of other web pages or introduction of content of a service usable by executing an application. Such web pages prompt users to access the other websites or to perform a download operation. Such web pages including a description representing introduction and content supply servers which provide such web pages are referred to as "introduction source sites" hereinafter. It is assumed that the introduction source sites or web content provided by the introduction source sites individually have unique content IDs. Furthermore, a jump to the next web page guided by the introduction source site by selecting an anchor on the introduction source site viewed by a user using the user terminal 110 or a download of an application is referred to as a "result" of the introduction source site. Tracking for recognizing the introduction source site which introduces the application used by the user terminal 110 is referred to as "measurement" of a result of the introduction source site. As will be described below, in this embodiment, information on association between a user terminal and an introduction source site which introduces an application to the user terminal is managed as "customer guiding information".

The application download site 130 is a server site which provides various applications executable by the user terminal 110. The Android market corresponds to the application download site 130. On the other hand, an application provider releases applications in a market server (not shown in FIG. 1), and the application download site 130 has links to applications to be downloaded from the market server.

Hereinafter, it is assumed that applications to be downloaded by the user terminal 110 are limited to those introduced by the introduction source site viewed by the web browser. Furthermore, it is assumed that the user terminal 110 downloads applications only through the application download site 130.

Here, since applications are downloaded from the market server to the user terminal 110 through the application download site 130, the market server may perform tracking to the application download site 130. However, it should be noted that it is the introduction source site that introduces an application to the user terminal 110 (specifically, a user who uses the user terminal 110) and causes the user terminal 110 to perform download, and a result thereof should not be obtained by the application download site 130 but should be obtained by the introduction source site. Specifically, the market server (or the application provider which provides applications in the market server) should pay rewards for a result of download of an application performed by the user terminal 110 to the introduction source site instead of the application download site 130.

The content provider server 140 corresponds to a server site which performs a process of a procedure of member registration or the like when an application downloaded from the application download site 130 is activated for the first time on the user terminal 110. An application used to perform a procedure of registration to the CP server 140 is referred to as a "CP application" where appropriate. The CP application is not allowed to be executed and used in the user terminal 110 unless the user terminal 110 downloads content of the application from the market server and subsequently completes the procedure of the registration to the CP server 140. In this case, a result of the introduction source site is not obtained at a time when the CP application is downloaded in the user terminal 110 but is obtained at a time when the procedure of the registration to the content provider server 140 is completed. Therefore, when the result of the introduction source site is to be measured, tracking should be performed so that the introduction source site which causes the user terminal 110 to download the CP application is identified at a time when the procedure of the registration to the content provider server 140 is completed. Hereinafter, measurement of a result of the introduction source site will be described while it is assumed that an application downloaded to the user terminal 110 is a CP application.

When the user terminal 110 is a multifunctional terminal incorporating the Android OS, for example, the user terminal 110 is not allowed to directly download an application through a web browser used to view the introduction source site. In this case, if the user terminal 110 tries to download an application through the application download site 130, first, the user terminal 110 activates the market application so as to access the application download site 130, such as the Android market. Thereafter, the user terminal 110 further performs a procedure of registration to the content provider server 140.

In general (or in a system in which an application is directly downloaded through a web browser without using the application download site 130), tracking to an introduction source site using a cookie (a system in which information on a website is temporarily written to the user terminal 110 through the web browser) or a URL has been used as a standard technique (as described above). However, in the case of this embodiment described above, tracking of download of a CP application is not appropriately performed and a result of the introduction source site is not measured in a system using a cookie or a URL due to the following reasons. That is, information on the introduction source site is not stored in the user terminal 110 since the market application does not cooperate with the web browser, and a result of the introduction source site is not generated when the CP application is downloaded from the market server but is generated when the CP application is activated for the first time and a procedure of registration to the content provider server 140 is completed.

As described above, the user terminal 110 includes the contactless IC chip 111 which stores the individual identification ID, such as a product serial number, used to identify an individual. Accordingly, in this embodiment, the contactless IC chip 111 included in the user terminal 110 cooperates with the affiliate measurement system 120 so that tracking to the introduction source site which introduces an application to the user terminal 110 is performed and measurement of a result of the introduction source site is realized even when the user terminal 110 downloads the application through the application download site 130 instead of the web browser or even when the user terminal 110 further performs a procedure of registration to the content provider server 140. The "customer guiding information" is stored in the affiliate measurement system 120 or the contactless IC chip 111 and is compared with information obtained by the CP server 140 whereby tracking of a result of content provision is performed.

Note that the contactless IC chip 111 has tamper resistance, and only authorized users may access the contactless IC chip 111. The contactless IC chip 111 employs an NFC (Near Field Communication) method, such as FeliCa, for example. Note that an operation of accessing the contactless IC chip 111 and an authentication technique are general ones and do not directly relate to the scope of the technique disclosed in this specification, and therefore, detailed descriptions thereof are omitted. Furthermore, a reader/writer device (RW) which performs reading from the contactless IC chip 111 is not shown in the drawing. Hereinafter, it is assumed that devices which access the contactless IC chip 111 have an authentication function.

The affiliate measurement system 120 includes an affiliate server 121 and a contactless IC chip access function unit 122. The affiliate server 121 performs tracking of a result of content supply of the content supply server. Note that the affiliate server 121 may have a content supply server function and serve as an introduction source site. The contactless IC chip access function unit 122 accesses the contactless IC chip 111 included in the user terminal 110 which has accessed the introduction source site and reads or writes information used to measure a result of the introduction source site. Note that the scope of the technique disclosed in this specification is not limited to the system configuration in which the affiliate measurement system 120 incorporates the contactless IC chip access function unit 122. For example, a contactless IC chip access function server (not shown in FIG. 1) may be provided outside the affiliate measurement system 120 and the affiliate measurement system 120 may request the contactless IC chip access function server to access the contactless IC chip 111 included in the user terminal 110 (that is, read and write of information used to measure a result of the introduction source site).

The affiliate server 121 includes a customer guiding information management unit 121A which manages customer guiding information and a result measurement unit 121B which measures a result of the introduction source site in accordance with the customer guiding information. The "customer guiding information" includes a combination of a content ID of the introduction source site (or web content thereof) accessed by the user terminal 110 and the individual identification ID of the user terminal 110 which has accessed the introduction source site. Note that, when the affiliate server 121 has a content supply server function and serves as an introduction source site, the "customer guiding information" only includes the individual identification ID of the user terminal 110 which has accessed the affiliate server 121.

The customer guiding information management unit 121A obtains a content ID used to identify content viewed by the web browser of the user terminal 110, that is, the introduction source site. Furthermore, the contactless IC chip access function unit 122 reads the individual identification ID of the user terminal 110 which has accessed the content from the contactless IC chip 111. Then the customer guiding information management unit 121A holds the "customer guiding information" including the obtained content ID and the individual identification ID so as to allow the result measurement unit 121B to perform tracking in a later stage. Alternatively, the customer guiding information management unit 121A may cause the contactless IC chip access function unit 122 to write the "customer guiding information" to the contactless IC chip 111 included in the user terminal 110 so as to allow the result measurement unit 121B to perform tracking in a later stage.

A flow of result tracking performed by the information communication system 100 will be described.
(1) View of Content Content of the content supply server (the introduction source site) which cooperates with the affiliate measurement system 120 (or content which is provided by the affiliate server 121) is viewed using the web browser activated in the user terminal 110.

The affiliate server 121 obtains a content ID of an introduction source site viewed through the web browser of the user terminal 110.
(2) Obtainment of Customer Guiding Information The introduction source site viewed through the web browser of the user terminal 110 introduces downloadable applications. The user terminal 110 activates a downloadable application, such as a market application, so as to access the application download site 130, such as the Android market.

In the user terminal 110, when display of the content supply server on the web browser is changed to display of an application download page, the contactless IC chip access function unit 122 of the affiliate measurement system 120 accesses the contactless IC chip 111 having the tamper resistance after a predetermined authentication process through a contactless IC chip access tool so as to obtain the individual identification ID. The contactless IC chip access tool is a web plug-in incorporated in the web browser, for example, and may read data from and write data to the contactless IC chip 111 having the tamper resistance after a predetermined procedure including the authentication process. Alternatively, the affiliate measurement system 120 itself may not have a unit which performs authenticated access to the contactless IC chip 111 and may request a contactless IC chip access function server (not shown in FIG. 1) having the same unit to obtain the individual identification ID from the contactless IC chip 111. The affiliate measurement system 120 specifies the user terminal 110 which performs a download of the application in accordance with the individual identification ID included in the contactless IC chip 111.

The customer guiding information management unit 121A holds the "customer guiding information" including the combination of the obtained content ID and the individual identification ID. Alternatively, the customer guiding information management unit 121A writes the content ID to the contactless IC chip 111 using the contactless IC chip access function unit 122 and the contactless IC chip access tool of the user terminal 110 and manages the "customer guiding information" including the combination of the content ID and the individual identification ID in the user terminal 110 which downloads the application.

The contactless IC chip 111 having the tamper resistance does not allow access to internal data without performing a predetermined procedure including authentication through the contactless IC chip access tool plugged in the web browser of the user terminal 110. Therefore, when the affiliate server 121 communicates with the user terminal 110 through middleware (such as a FeliCa OS) of the user terminal 110 in order to obtain the individual identification ID from the contactless IC chip 111, spoofing of the introduction source site and a fake result may be eliminated and the individual identification ID read from the contactless IC chip 111 and the content ID written in the contactless IC chip 111 have secure values.

(3) Download of Application

The user terminal 110 downloads a desired application from the market server through the accessed application download site 130.

(4) Obtainment of Individual Identification ID

The CP server 140 is managed by a provider of the application downloaded to the user terminal 110, for example. The CP server 140 executes a procedure of member registration when a CP application downloaded by the user terminal 110 is activated for the first time. When a status desired by the provider of the CP application, such as a status of completion of the member registration, is entered, execution of the CP application downloaded by the user terminal 110 is enabled and a result for the introduction of the CP application of the content supply server (introduction source site) is generated.

In this embodiment, it is assumed that the CP application has a function of accessing the contactless IC chip 111 having the tamper resistance after being downloaded in the user terminal 110.

The CP server 140 obtains the individual identification ID or the customer guiding information from the contactless IC chip 111 of the user terminal 110 which performs the registration procedure of the CP application in order to perform a process of measuring the result of the introduction source site in a later stage. Specifically, when the application downloaded by the user terminal 110 is activated for the first time, the CP application reads the individual identification ID or the customer guiding information from the contactless IC chip 111. Then the CP application transmits information on the result, such as the obtained individual identification ID or the obtained customer guiding information, to the result measurement unit 121B of the affiliate server 121.

(5) Measurement of Result Information

As described above, the customer guiding information management unit 121A of the affiliate server 121 manages the customer guiding information including the combination of the individual identification ID of the user terminal 110 which has accessed the introduction source site and the content ID of the introduction source site by storing the customer guiding information in the affiliate server 121 or by writing the customer guiding information in the contactless IC chip 111 of the user terminal 110. Furthermore, the "result" of the introduction source site is generated when the procedure of the registration to the content provider server 140 is completed after the user terminal 110 activates the downloaded application for the first time. Irrespective of a management method for managing the customer guiding information, the result measurement unit 121B may measure the result of the introduction source site by tallying customer guiding information corresponding to the generated result. For example, the total number of customer guiding information having a certain content ID in which a result is generated corresponds to the number of user terminals which have used an application introduced by a certain introduction source site, that is, results of the introduction source site.

In the affiliate measurement system 120, the result measurement unit 121B compares the information supplied from the CP server 140 with the information stored in the customer guiding information management unit 121A so as to measure a result of the introduction source site.

When the customer guiding information management unit 121A of the affiliate server 121 holds the customer guiding information so as to manage the customer guiding information, the CP server 140 reads the individual identification ID through the CP application from the contactless IC chip 111 of the user terminal 110 which performs the registration of the CP application for the first time and transmits the individual identification ID to the affiliate server 121. Then the result measurement unit 121B compares the customer guiding information held by the affiliate server 121 with the supplied individual identification ID so as to recognize that a result of the introduction source site corresponding to the content ID described in the customer guiding information is generated.

Furthermore, when the affiliate server 121 does not hold the customer guiding information but the contactless IC chip 111 of the user terminal 110 manages the customer guiding information written therein, the CP server 140 reads the customer guiding information from the contactless IC chip 111 of the user terminal 110 which performs the registration of the CP application for the first time and transmits the customer guiding information to the affiliate server 121. Then the result measurement unit 121B recognizes that a result of the introduction source site corresponding to the content ID described in the received customer guiding information is generated.

Irrespective of the measurement method employed by the result measurement unit 121B, the customer guiding information or the individual identification ID used for the measurement of a result of the introduction source site is a secure value read from the contactless IC chip 111 having the tamper resistance, and therefore, spoofing of the introduction source site and a fake result may be avoided.

Figure 2:
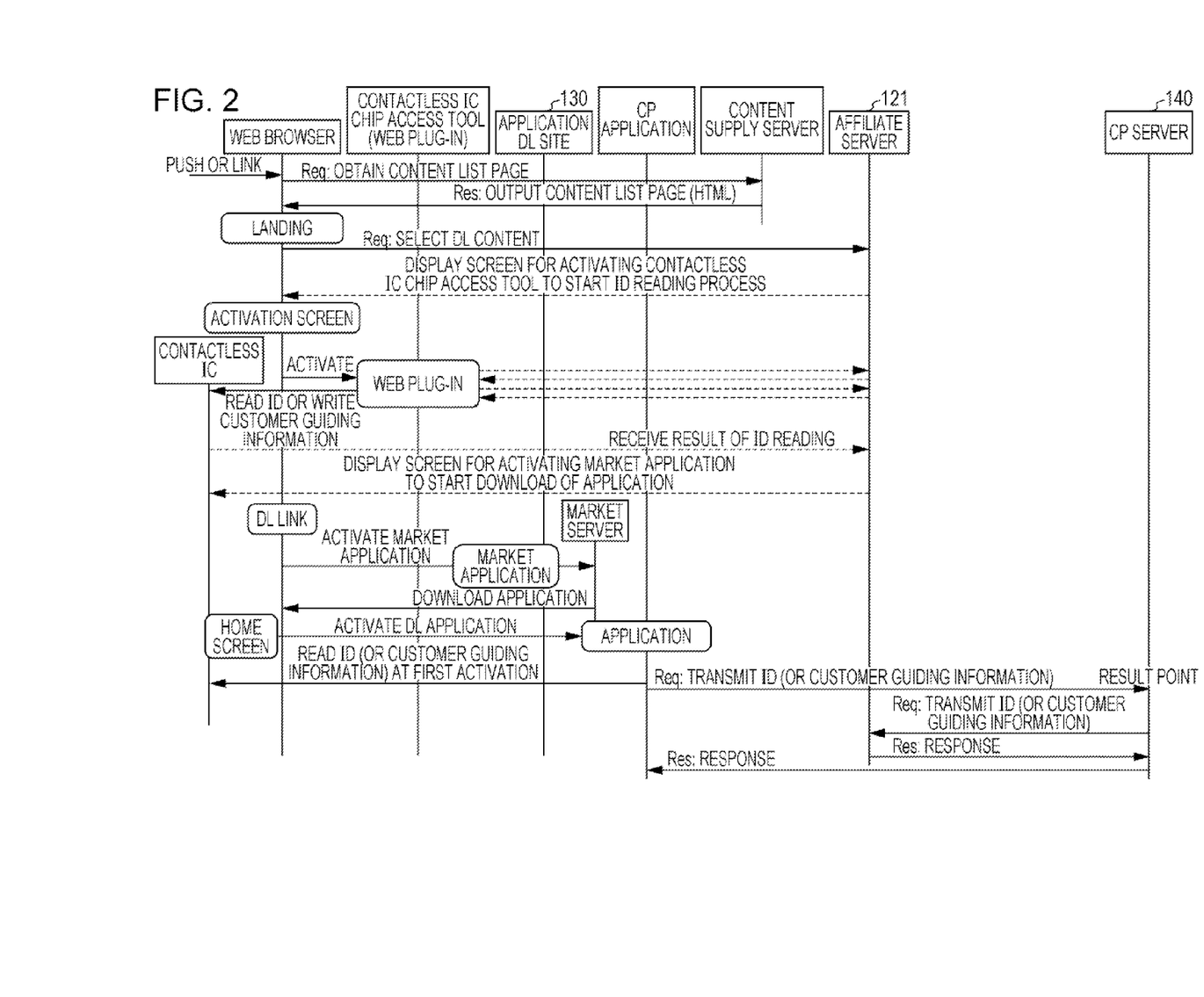
FIG. 2 is a diagram illustrating a communication sequence in a case where a download of an application to a user terminal and measurement of a result of an introduction source site are performed by the information communication system.

FIG. 2 is a diagram illustrating a communication sequence in a case where a download of an application to the user terminal 110 and measurement of a result of the introduction source site are performed by the information communication system 100 illustrated in FIG. 1.

In the user terminal 110, the web browser is activated and the contactless IC chip access tool which is a web plug-in is plugged in the web browser.

When a certain push button or a link button is operated on the web browser of the user terminal 110, a content list page obtainment request is transmitted to the content supply server (the introduction source site). On the other hand, the content supply server returns a content list page of an HTML (Hyper Text Markup Language) format, for example, to the web browser. Note that the affiliate server 121 may serve as the content supply server (the introduction source site) and perform supply and transmission of the content list page.

Next, the web browser of the user terminal 110 displays a landing page on a screen. Then an operation of selecting content (DL content), such as an application to be downloaded to the user terminal 110, is performed through the landing page. In response to the selection operation, a request for downloading an application is supplied to the affiliate server 121. It is assumed that the application requested to be downloaded is a CP application (as described above).

The customer guiding information management unit 121A of the affiliate server 121 obtains and stores a content ID of the page in which the download of the application is requested, that is, a content ID of the introduction source site. The affiliate server 121 starts an operation of reading an individual identification ID stored in the contactless IC chip 111 of the user terminal 110 which has transmitted the download request.

The customer guiding information management unit 121A of the affiliate server 121 displays a screen for activating the contactless IC chip access tool which is the web plug-in in the user terminal 110 so that the operation of reading the individual identification ID is performed. On the other hand, the web browser displays the activation screen and activates the contactless IC chip access tool.

The customer guiding information management unit 121A of the affiliate server 121 communicates with the contactless IC chip access tool through the contactless IC chip access function unit 122 and causes the contactless IC chip access tool to read the individual identification ID from the contactless IC chip 111.

Thereafter, when receiving a result of the reading of the individual identification ID performed by the contactless IC chip access tool from the web browser, the customer guiding information management unit 121A of the affiliate server 121 associates the resultant individual identification ID with the obtained content ID of the introduction source site and stores the individual identification ID and the content ID associated with each other as customer guiding information in the affiliate server 121. Alternatively, the customer guiding information management unit 121A of the affiliate server 121 may write the customer guiding information to the contactless IC chip 111 of the user terminal 110 through the contactless IC chip access tool so as to manage the customer guiding information using the contactless IC chip 111.

Thereafter, the affiliate server 121 displays a screen for activating the market application in order to start download of the CP application from the content provider server 140 by the user terminal 110.

On the other hand, the user terminal 110 activates the market application so as to access the application download site 130, such as the Android market, and escapes from the web browser screen. Then the user terminal 110 downloads content of the selected CP application from the market server through the screen of the application download site 130.

After the download of the application, an icon corresponding to the application is displayed in a home screen of the user terminal 110, and the application is activated by selecting the icon. When the CP application is activated for the first time in the user terminal 110, a predetermined operation, such as member registration to the content provider server 140, is performed.

The application reads the individual identification ID from the contactless IC chip 111 of the user terminal 110 when being activated for the first time. Alternatively, when the customer guiding information is written in the contactless IC chip 111 before the application download site 130 is entered, the application reads the customer guiding information. Then the CP application transmits the individual identification ID or the customer guiding information to the CP server 140.

When a certain status desired by the provider of the CP application is entered, such as a status in which the user terminal 110 completes the member registration to the content provider server 140, a result of the introduction of the CP application by the content supply server (the introduction source site) is generated.

The CP server 140 obtains the individual identification ID or the customer guiding information from the contactless IC chip 111 of the user terminal 110 which performs the registration procedure of the CP application so that a process of measuring the result of the introduction source site is performed in a later stage. Specifically, when the application downloaded by the user terminal 110 is activated for the first time, the CP application reads the individual identification ID or the customer guiding information from the contactless IC chip 111. Then the CP application transmits information on the result, such as the obtained individual identification ID or the obtained customer guiding information, to the result measurement unit 121B of the affiliate server 121.

In the affiliate server 121, the result measurement unit 121B compares the information supplied from the CP server 140 with the information stored in the customer guiding information management unit 121A so as to measure a result of the introduction source site.

When the customer guiding information management unit 121A of the affiliate server 121 holds the customer guiding information so as to manage the customer guiding information, the CP server 140 reads the individual identification ID through the CP application from the contactless IC chip 111 of the user terminal 110 which performs the registration of the CP application for the first time and transmits the read individual identification ID to the affiliate server 121.

Furthermore, when the affiliate server 121 does not hold the customer guiding information but the contactless IC chip 111 of the user terminal 110 manages the customer guiding information written therein, the CP server 140 reads the customer guiding information from the contactless IC chip 111 of the user terminal 110 which performs the registration of the CP application for the first time and transmits the read customer guiding information to the affiliate server 121.

When receiving the individual identification ID or the customer guiding information from the CP server 140, the affiliate server 121 measures the result of the introduction source site and transmits a response to the CP server 140. When the CP server 140 transmits a response to the application activated in the user terminal 110, the application becomes available in the user terminal 110.

Figure 3:
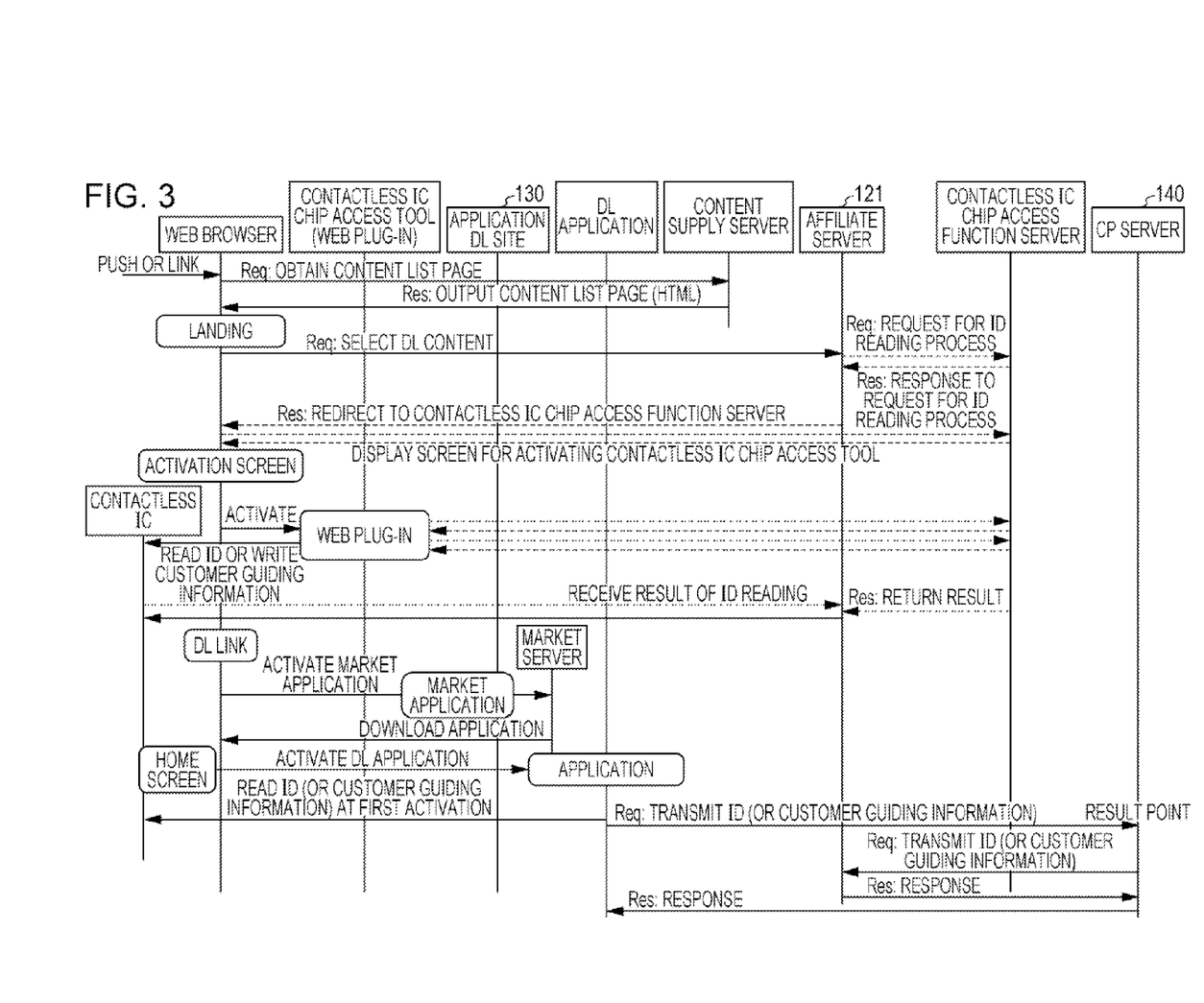
FIG. 3 is a diagram illustrating another communication sequence in a case where a download of an application to the user terminal and measurement of a result of the introduction source site are performed by the information communication system.

FIG. 3 is a diagram illustrating another communication sequence in a case where a download of an application to the user terminal 110 and measurement of a result of the introduction source site are performed by the information communication system 100. The communication sequence illustrated in FIG. 3 is different from that illustrated in FIG. 2 in that the affiliate server 121 transmits a request for accessing the contactless IC chip 111 of the user terminal 110 to a contactless IC chip access function server.

When a certain push button or a link button is operated on the web browser of the user terminal 110, a content list page obtainment request is transmitted to the content supply server (the introduction source site). On the other hand, the content supply server returns a content list page of an HTML format, for example, to the web browser. Note that the affiliate server 121 may serve as the content supply server (the introduction source site) and perform supply and transmission of the content list page.

Next, the web browser of the user terminal 110 displays a landing page on a screen. Then an operation of selecting content to be downloaded to the user terminal 110 is performed through the landing page. In response to the selection operation, a request for downloading an application is supplied to the affiliate server 121. It is assumed that the application requested to be downloaded is a CP application (as described above).

The customer guiding information management unit 121A of the affiliate server 121 obtains and stores a content ID of the page in which the download of the application is requested, that is, a content ID of the introduction source site. The affiliate server 121 requests the contactless IC chip access function server to read the individual identification ID stored in the contactless IC chip 111 of the user terminal 110 which has transmitted the download request. Furthermore, the affiliate server 121 returns a response representing redirection to the contactless IC chip access function server to the web browser of the user terminal 110.

The contactless IC chip access function server displays a screen for activating the contactless IC chip access tool which is the web plug-in in the user terminal 110 so that an operation of reading the individual identification ID is performed. On the other hand, the web browser displays the activation screen and activates the contactless IC chip access tool.

The contactless IC chip access function server communicates with the activated contactless IC chip access tool and causes the contactless IC chip access tool to read the individual identification ID from the contactless IC chip 111. Then the contactless IC chip access function server returns a result of the ID reading to the affiliate server 121.

When receiving the response from the contactless IC chip access function server, the customer guiding information management unit 121A of the affiliate server 121 associates the response with the obtained content ID of the introduction source site and stores the result and the content ID associated with each other as customer guiding information. Alternatively, the customer guiding information management unit 121A of the affiliate server 121 may write the customer guiding information to the contactless IC chip 111 of the user terminal 110 through the contactless IC chip access function server so as to manage the customer guiding information using the contactless IC chip 111.

Thereafter, the affiliate server 121 displays a screen for activating the market application so that a download of the CP application from the CP server 140 is started by the user terminal 110.

On the other hand, the user terminal 110 activates the market application so as to access the application download site 130, such as the Android market, and escapes from the web browser screen. Then the user terminal 110 downloads content of the selected CP application from the market server through the screen of the application download site 130.

After the download of the application, an icon corresponding to the application is displayed in a home screen of the user terminal 110, and the application is activated by selecting the icon. When the CP application is activated for the first time in the user terminal 110, a predetermined operation, such as member registration to the CP server 140, is performed.

The application reads the individual identification ID from the contactless IC chip 111 of the user terminal 110 when being activated for the first time. Alternatively, when customer guiding information is written in the contactless IC chip 111 before the application download site 130 is entered, the application reads the customer guiding information. Then the CP application transmits the individual identification ID or the customer guiding information to the CP server 140.

When a certain status desired by the provider of the CP application is entered, such as a status in which the user terminal 110 completes the member registration to the CP server 140, a result of the introduction of the CP application by the content supply server (the introduction source site) is generated.

The CP server 140 obtains the individual identification ID or the customer guiding information from the contactless IC chip 111 of the user terminal 110 which performs the registration procedure of the CP application so that a process of measuring the result of the introduction source site is performed in a later stage. Specifically, when the application downloaded by the user terminal 110 is activated for the first time, the CP application reads the individual identification ID or the customer guiding information from the contactless IC chip 111. Then the CP application transmits information on the result, such as the obtained individual identification ID or the obtained customer guiding information, to the result measurement unit 121B of the affiliate server 121.

In the affiliate server 121, the result measurement unit 121B compares the information supplied from the CP server 140 with the information stored in the customer guiding information management unit 121A so as to measure a result of the introduction source site.

When the customer guiding information management unit 121A of the affiliate server 121 holds the customer guiding information so as to manage the customer guiding information, the CP server 140 reads the individual identification ID through the CP application from the contactless IC chip 111 of the user terminal 110 which performs the registration of the CP application for the first time and transmits the read individual identification ID to the affiliate server 121.

Furthermore, when the affiliate server 121 does not hold the customer guiding information but the contactless IC chip 111 of the user terminal 110 manages the customer guiding information written therein, the CP server 140 reads the customer guiding information from the contactless IC chip 111 of the user terminal 110 which performs the registration of the CP application for the first time and transmits the read customer guiding information to the affiliate server 121.

When receiving the individual identification ID or the customer guiding information from the CP server 140, the affiliate server 121 measures the result of the introduction source site and transmits a response to the CP server 140. When the CP server 140 transmits a response to the application activated in the user terminal 110, the application becomes available in the user terminal 110.

According to the information communication system 100 of this embodiment, since a secure value which is stored in the contactless IC chip included in the user terminal 110 and which may avoid the spoofing of the introduction source site and a fake result is used, a fake result of affiliate may be suppressed.

Furthermore, according to the information communication system 100 of this embodiment, tracking is performed by tracing back to a time point when a download of an application to the user terminal 110 is actually completed in addition to a time point when an application introduction page of the web browser is changed to a screen of an application download site in the user terminal 110. Accordingly, even when the user terminal 110 downloads an application through a download site, such as the Android market, the application provider may perform tracking to an introduction source site and a reliable affiliate service is realized.

Moreover, the information communication system 100 of this embodiment may perform tracking, even when a result is generated at a time when a certain operation, such as member registration, is completed after downloading, instead of a time when an application is downloaded to the user terminal 110. Specifically, a result of affiliate may be measured in a status desired by the application provider, such as a status in which a download is completed, a status in which member registration is completed, or the like.

Note that the disclosed technique of this specification may be configured as follows.

(1) An information processing apparatus including a customer guiding information management unit configured to obtain a content ID used to identify an application introduction source site and an individual identification ID used to identify a user terminal which has accessed the introduction source site and manage the content ID and the individual identification ID as customer guiding information, and a result measurement unit configured to obtain information including an individual identification ID of a user terminal which has downloaded an application, compare the information with the customer guiding information managed by the customer guiding information management unit, and measure a result of the introduction source site identified by the content ID included in the customer guiding information.

(2) The information processing apparatus according to (1), wherein the customer guiding information management unit obtains an individual identification ID stored in a contactless IC chip included in a user terminal which has accessed the introduction source site.

(3) The information processing apparatus according to (1), wherein the customer guiding information management unit obtains an individual identification ID stored in a contactless IC chip included in the user terminal in response to an operation of selecting an application to be downloaded from the introduction source site performed by the user terminal.

(4) The information processing apparatus according to (1), wherein the customer guiding information management unit stores the customer guiding information in the information processing apparatus.

(5) The information processing apparatus according to (1), wherein the customer guiding information management unit writes the customer guiding information to a contactless IC chip included in the user terminal.

(6) The information processing apparatus according to (1), wherein the result measurement unit measures a result of the introduction source site when the application downloaded in the user terminal enters a predetermined state in the user terminal.

(7) The information processing apparatus according to (1), wherein the result measurement unit measures a result of the introduction source site when the application downloaded in the user terminal is activated for the first time and a predetermined procedure of registration to a predetermined server is completed.

(8) The information processing apparatus according to (1), wherein the application downloaded in the user terminal reads information used for result measurement from a contactless IC chip included in the user terminal when being activated for the first time and transmits the read information to a predetermined server, and the result measurement unit measures a result of a corresponding introduction source site in accordance with the information used for the result measurement which is received through the predetermined server.

(9) The information processing apparatus according to (1), wherein the application activated in the user terminal reads the individual identification ID from a contactless IC chip included in the user terminal and transmits the individual identification ID to a predetermined server, and the result measurement unit compares the individual identification ID supplied through the predetermined server with the customer guiding information stored in the customer guiding information management unit and measures a result of a corresponding introduction source site.

(10) The information processing apparatus according to (1), wherein the customer guiding information management unit writes the customer guiding information to a contactless IC chip included in a corresponding user terminal, the application activated in the user terminal reads the customer guiding information from the contactless IC chip included in the user terminal and transmits the customer guiding information to a predetermined server, and the result measurement unit measures a result of a corresponding introduction source site in accordance with the customer guiding information supplied through the predetermined server.

(11) An information processing method including obtaining a content ID used to identify an application introduction source site and an individual identification ID used to identify a user terminal which has accessed the introduction source site and managing the content ID and the individual identification ID as customer guiding information, and obtaining information including an individual identification ID of a user terminal which has downloaded an application, comparing the information with the managed customer guiding information, and measuring a result of the introduction source site identified by the content ID included in the customer guiding information.

(12) An information communication system including an application introduction source site, a user terminal configured to include a contactless IC chip which stores at least an individual identification ID and download an application introduced by the application introduction source site from an application download site, a content provider server configured to perform a predetermined procedure associated with the application downloaded by the user terminal, and an affiliate measurement system configured to obtain a content ID used to identify the application introduction source site and an individual identification ID used to identify the user terminal which has accessed the introduction source site, manage the content ID and the individual identification ID as customer guiding information, compare information read by the content provider server from a contactless IC chip included in the user terminal which performs the predetermined procedure with the customer guiding information, and measure a result of the introduction source site identified by the content ID included in the customer guiding information.

(13) A computer readable program that causes a computer to function as a customer guiding information management unit configured to obtain a content ID used to identify an application introduction source site and an individual identification ID used to identify a user terminal which has accessed the introduction source site and manage the content ID and the individual identification ID as customer guiding information, and a result measurement unit configured to obtain information including an individual identification ID of a user terminal which has downloaded an application, compare the information with the customer guiding information managed by the customer guiding information management unit, and measure a result of the introduction source site identified by the content ID included in the customer guiding information.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a customer guiding information management unit configured to:
cause a user terminal to:
display a screen for activation of a contactless IC chip, and
activate the contactless IC chip based on an authentication process;
obtain a content ID, from a server via a communication network, that identifies an application introduction source site and an individual identification ID, from the user terminal via the communication network, that is stored in the contactless IC chip of the user terminal based on activation of the contactless IC chip,
wherein the individual identification ID identifies the user terminal which has accessed the application introduction source site to download an application; and
manage the content ID and the individual identification ID as customer guiding information; and
a result measurement unit configured to:
obtain result measurement information including the individual identification ID of the user terminal, which has downloaded the application, from the server based on an activation of the application at the user terminal; and
compare the result measurement information with the customer guiding information managed by the customer guiding information management unit to track the application introduction source site,
wherein the tracked application introduction source site receives rewards as a result of download of the application.

2. The information processing apparatus according to claim 1, wherein the customer guiding information management unit is further configured to obtain the individual identification ID stored in the contactless IC chip included in the user terminal which has accessed the application introduction source site.

3. The information processing apparatus according to claim 1, wherein the customer guiding information management unit is further configured to obtain the individual identification ID stored in the contactless IC chip included in the user terminal based on selection of the application for download from the application introduction source site by the user terminal.

4. The information processing apparatus according to claim 1, wherein the customer guiding information management unit is further configured to store the customer guiding information in the information processing apparatus.

5. The information processing apparatus according to claim 1, wherein the customer guiding information management unit is further configured to store the customer guiding information to the contactless IC chip included in the user terminal.

6. The information processing apparatus according to claim 1, wherein the result measurement unit is further configured to track the application introduction source site based on the application downloaded on the user terminal enters a specific state in the user terminal.

7. The information processing apparatus according to claim 1, wherein the result measurement unit is further configured to track the application introduction source site based on the application downloaded on the user terminal is activated for a first time and a procedure of registration to the server is completed.

8. The information processing apparatus according to claim 1,
wherein the application downloaded on the user terminal reads the result measurement information from the contactless IC chip included in the user terminal based on activation of the application for a first time and transmit the result measurement information to the server, and
wherein the result measurement unit is further configured to track the application introduction source site based on the result measurement information received via the server.

9. The information processing apparatus according to claim 1,
wherein the application activated in the user terminal reads the individual identification ID from the contactless IC chip included in the user terminal and transmit the individual identification ID to the server, and
wherein the result measurement unit is further configured to compare the individual identification ID supplied via the server with the customer guiding information stored in the customer guiding information management unit and track the application introduction source site based on the comparison.

10. The information processing apparatus according to claim 1,
wherein the customer guiding information management unit is further configured to write the customer guiding information to the contactless IC chip included in the corresponding user terminal,
wherein the application activated in the user terminal is reads the customer guiding information from the contactless IC chip included in the user terminal and transmit the customer guiding information to the server, and wherein the result measurement unit is further configured to track the corresponding application introduction source site based on the customer guiding information that is supplied via the server.

11. An information processing method, comprising:
in an information processing apparatus:
  causing a user terminal to:
    display a screen for activation of a contactless IC chip, and
    activate the contactless IC chip based on an authentication process;
  obtaining a content ID, from a server via a communication network, that identifies an application introduction source site and an individual identification ID, from the user terminal via the communication network, that is stored in the contactless IC chip of the user terminal based on activation of the contactless IC chip,
  wherein the individual identification ID identifies the user terminal which has accessed the application introduction source site to download an application;
  managing the content ID and the individual identification ID as customer guiding information;
  obtaining result measurement information including the individual identification ID of the user terminal, which has downloaded the application, from the server after an activation of the application at the user terminal; and
  comparing the result measurement information with the customer guiding information to track the application introduction source site,
  wherein the tracked application introduction source site receives rewards as a result of download of the application.

12. An information communication system, comprising:
  an application introduction source site;
  a user terminal comprising a contactless IC chip, wherein the contactless IC chip is configured to store at least an individual identification ID and download an application introduced by the application introduction source site from an application download site;
  a server configured to obtain result measurement information including the individual identification ID of the user terminal, which has downloaded the application, based on an activation of the application at the user terminal; and
  an affiliate measurement system configured to:
    cause the user terminal to:
      display a screen for activation of the contactless IC chip, and
      activate the contactless IC chip based on an authentication process;
    obtain a content ID, from the server via a communication network, that identifies the application introduction source site and the individual identification ID, from the user terminal via the communication network, that identifies the user terminal which has accessed the application introduction source site to download the application;
    manage the content ID and the individual identification ID as customer guiding information;
    compare the result measurement information obtained from the server with the customer guiding information, wherein the server is configured to:
    track the application introduction source site, and
    wherein the application introduction source site receives rewards as a result of download of the application based on the tracking.

13. A non-transitory computer-readable storage medium having stored thereon, a computer-executable instructions for causing an information processing apparatus to execute operations, the operations comprising:
  causing a user terminal to:
    display a screen for activation of a contactless IC chip, and
    activate the contactless IC chip based on an authentication process;
  obtaining a content ID, from a server via a communication network, that identifies an application introduction source site and an individual identification ID, from the user terminal via the communication network, that is stored in the contactless IC chip of the user terminal based on activation of the contactless IC chip,
  wherein the individual identification ID identifies the user terminal which has accessed the application introduction source site to download an application;
  managing the content ID and the individual identification ID as customer guiding information;
  obtaining result measurement information including the individual identification ID of the user terminal, which has downloaded the application, from the server after an activation of the application at the user terminal;
  comparing the result measurement information with the customer guiding information to track the application introduction source site,
  wherein the tracked application introduction source site receives rewards as a result of download of the application.

* * * * *